US012445977B2

United States Patent
Matsumura et al.

(10) Patent No.: US 12,445,977 B2
(45) Date of Patent: Oct. 14, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 405 days.

(21) Appl. No.: 18/003,784

(22) PCT Filed: Jul. 3, 2020

(86) PCT No.: PCT/JP2020/026152
§ 371 (c)(1),
(2) Date: Dec. 29, 2022

(87) PCT Pub. No.: WO2022/003940
PCT Pub. Date: Jan. 6, 2022

(65) Prior Publication Data
US 2023/0262612 A1   Aug. 17, 2023

(51) Int. Cl.
*H04W 52/36* (2009.01)
(52) U.S. Cl.
CPC .................. *H04W 52/365* (2013.01)
(58) Field of Classification Search
CPC ............. H04W 52/365; H04W 52/242; H04W 52/367; H04W 52/36; H04W 52/24
See application file for complete search history.

(56) References Cited

U.S. PATENT DOCUMENTS

| 2023/0033126 A1* | 2/2023 | Agiwal ............... H04B 17/318 |
| 2023/0041095 A1* | 2/2023 | Zhou .................. H04L 5/0057 |
| 2023/0262612 A1* | 8/2023 | Matsumura .......... H04W 16/28 |
| | | 455/522 |

FOREIGN PATENT DOCUMENTS

| EP | 3754864 A1 | 12/2020 |
| WO | 2019/028716 A1 | 2/2019 |
| WO | 2019/159301 A1 | 8/2019 |

OTHER PUBLICATIONS

International Search Report for corresponding International Application No. PCT/JP2020/026152, mailed Feb. 16, 2021 (5 pages).
Written Opinion for corresponding International Application No. PCT/JP2020/026152, mailed Feb. 16, 2021 (3 pages).
(Continued)

*Primary Examiner* — John J Lee
(74) *Attorney, Agent, or Firm* — Osha Bergman Watanabe & Burton LLP

(57) ABSTRACT

A terminal according to one aspect of the present disclosure includes a control section that, when a trigger event related to a given panel occurs, triggers power headroom report (PHR) related to the given panel, and a transmitting section that transmits a Medium Access Control (MAC) control element related to the triggered PHR. The trigger event includes an event in which a periodic timer related to the given panel expires. According to one aspect of the present disclosure, PHR related to a panel can be appropriately triggered/transmitted.

3 Claims, 10 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Ericsson; "Miscellaneous corrections to MAC"; 3GPP TSG-RAN2 Meeting #65, R2-091659; Athens, Greece; Feb. 9-13, 2009 (14 pages).
Office Action issued in counterpart Chinese Patent Application No. 202080103789.7 mailed on Apr. 26, 2024 (15 pages).
Office Action issued in Japanese Patent Application No. 2022-532986, dated Aug. 27, 2024 (9 pages).
Office Action issued in Chinese Patent Application No. 202080103789.7, dated Oct. 8, 2024 (14 pages).
3GPP TSG RAN WG1 Meeting #99; R1-1911943; ZTE; "Enhancement on FR2 MPE mitigation"; Reno, US; Nov. 18-22, 2019 (3 pages).
3GPP TSG RAN WG1 Meeting #101-e; R1-2003483; ZTE; "Preliminary views on further enhancement for NR MIMO"; e-Meeting, May 25-Jun. 5, 2020 (18 pages).
3GPP TSG-RAN WG2 Meeting #99bis; R2-1711437; Huawei, HiSilicon; "Content of the PHR"; Prague, Czech Republic, Oct. 9-13, 2017 (2 pages).
3GPP TSG-RAN2 Meeting #AH-1801; R2-1801043; Huawei, HiSilicon; "Consideration on PHR with multi-beam operation"; Vancouver, Canada, Jan. 22-26, 2018 (6 pages).
3GPP TSG RAN WG4 Meeting #93; R4-1913920; ZTE; "Enhancement on FR2 MPE mitigation"; Reno, US; Nov. 18-22, 2019 (4 pages).

\* cited by examiner

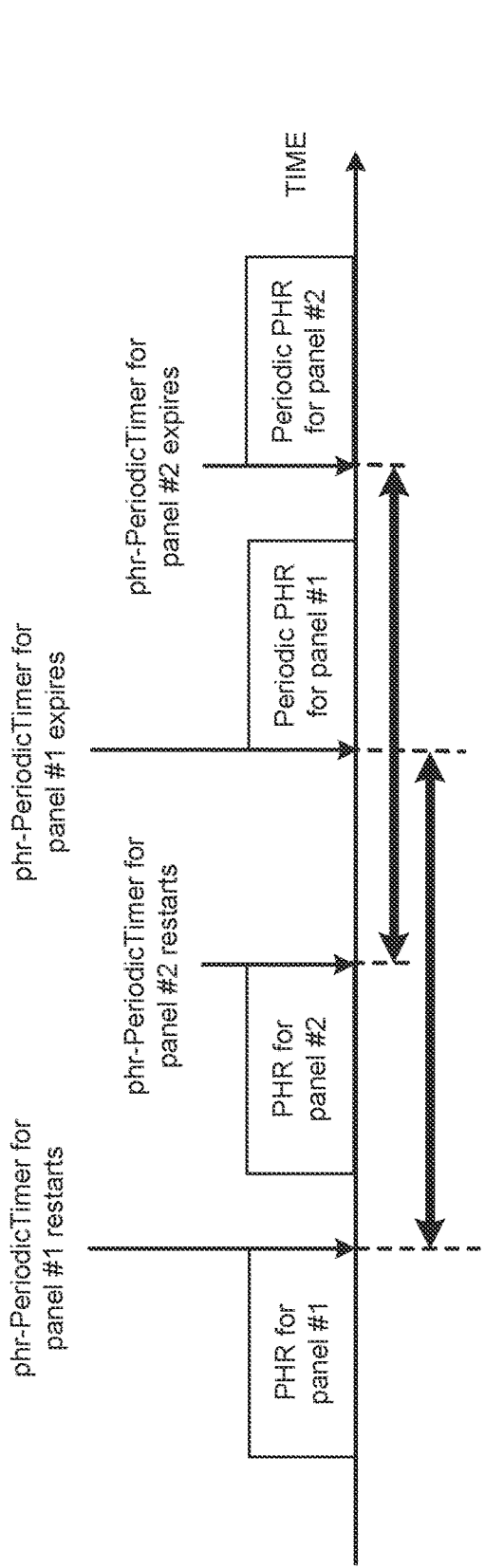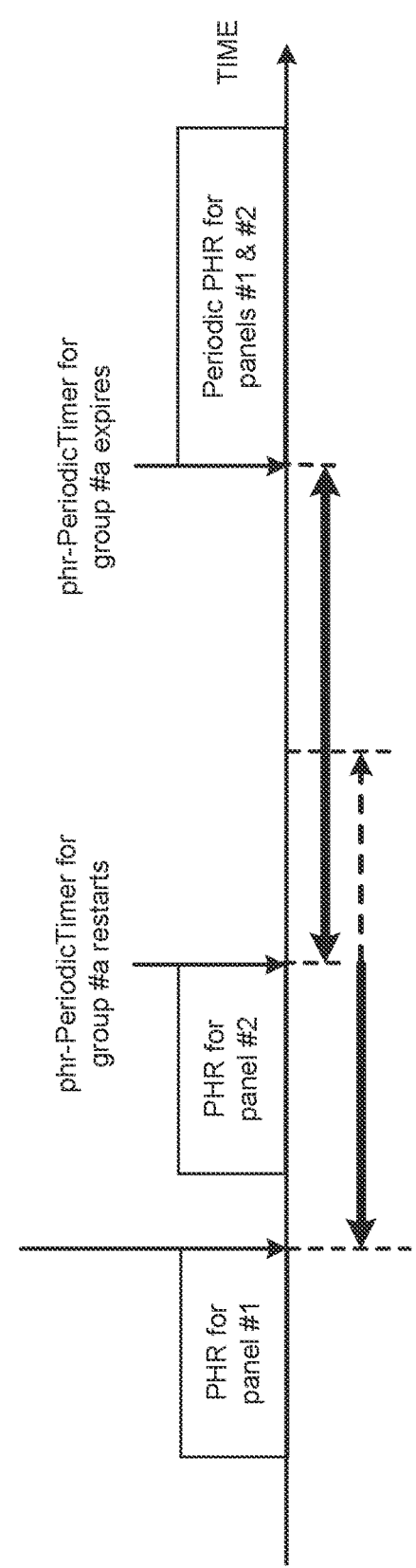
FIG. 6A
FIG. 6B

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., also referred to as "5th generation mobile communication system (5G)," "5G+ (plus)," "6th generation mobile communication system (6G)", "New Radio (NR)," "3GPP Rel. 15 or later versions," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, a user terminal (User Equipment (UE)) transmits a PH report (Power Headroom Report (PHR)) including information of power headroom (PH) for each serving cell to a network. The network can use the PHR for control of uplink transmission power of the UE.

In NR, measures against a problem of maximum permitted exposure (MPE) (or electromagnetic power density exposure) are studied.

In NR, the following is studied: UL transmit beam selection is prompted by taking UL coverage loss due to MPE into consideration based on UL beam indication for the sake of rapid selection of a UL panel regarding the UE equipped with a plurality of panels.

However, the current specifications fail to appropriately take panels into consideration, and thus it is assumed that the PHR is triggered when the PHR need not necessarily be triggered. Unless appropriate transmission of the PHR is performed, communication throughput, communication quality, and the like may be deteriorated.

In view of this, the present disclosure has one object to provide a terminal, a radio communication method, and a base station that enable appropriate trigger/transmission of PHR related to a panel.

Solution to Problem

A terminal according to one aspect of the present disclosure includes a control section that, when a trigger event related to a given panel occurs, triggers power headroom report (PHR) related to the given panel, and a transmitting section that transmits a Medium Access Control (MAC) control element related to the triggered PHR. The trigger event includes an event in which a periodic timer related to the given panel expires.

Advantageous Effects of Invention

According to one aspect of the present disclosure, PHR related to a panel can be appropriately triggered/transmitted.

BRIEF DESCRIPTION OF DRAWINGS

FIGS. 6A and 6B are each a diagram to show another example of control related to the periodic timer according to the third embodiment;

DESCRIPTION OF EMBODIMENTS (PHR)

In NR, a UE transmits a PH report (Power Headroom Report (PHR)) including information of power headroom (PH) for each serving cell to a network. The network can use the PHR for control of uplink transmission power of the UE.

The PHR may be transmitted by MAC (Medium Access Control) signaling using a PUSCH (Physical Uplink Shared Channel). For example, the PHR is reported using a PHR MAC CE (Control Element) included in a MAC PDU (Protocol Data Unit).

Figure 1:
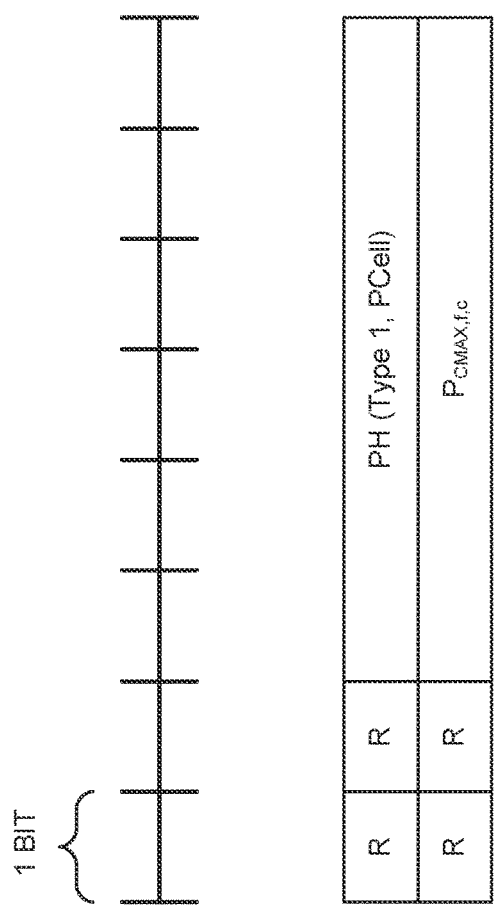
FIG. 1 is a diagram to show an example of a PHR MAC CE in Rel. 15 NR.

FIG. 1 is a diagram to show an example of the PHR MAC CE in Rel. 15 NR. FIG. 1 is a single entry PHR MAC CE. The MAC CE includes two octets (=16 bits). Each 'R' of FIG. 1 indicates a reserved field of 1 bit, and is set to a value of '0', for example.

'PH (Type 1, PCell)' of FIG. 1 indicates a field of 6 bits, and indicates an index related to type 1 PH of a PCell (primary cell). The index related to PH is associated with a specific PH value (or level (dB)).

Note that, for example, type 1 PH may be PH when a PUSCH is taken into consideration (for example, only power of the PUSCH is taken into consideration), type 2 PH may be PH when a PUCCH is taken into consideration (for example, power of both of the PUSCH and the PUCCH is taken into consideration), and type 3 PH may be PH when a reference signal for measurement (SRS (Sounding Reference Signal)) is taken into consideration (for example, power of the PUSCH and the SRS is taken into consideration).

'$P_{CMAX,f,c}$' of FIG. 1 indicates a field of 6 bits, and indicates an index related to $P_{CMAX,f,c}$ used for calculation of the PH field. The index related to $P_{CMAX,f,c}$ is associated with a specific UE transmission power level (dB). Note that $P_{CMAX,f,c}$ may be referred to as maximum configured transmission power (maximum permitted transmission power) of the UE for a serving cell c of a carrier f. $P_{CMAX,f,c}$ is hereinafter also simply referred to as $P_{CMAX}$.

Note that, in NR, a multiple entry PHR MAC CE including a plurality of pieces of data similar to the above-described single entry (two octets) is also supported. The multiple entry PHR MAC CE may include a PH field for a PSCell (primary secondary cell) or an SCell and the like.

The network may transmit PHR configuration information related to a condition of triggering the PHR to the UE. Here, examples of the PHR configuration information include a prohibit timer, a periodic timer, a threshold of a change of path loss, and the like. Higher layer signaling may be used for reporting thereof. When a PHR trigger condition is satisfied, the UE triggers the PHR.

Note that, in the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

(MPE)

In NR, measures against a problem of maximum permitted exposure (MPE) (or electromagnetic power density exposure) are studied. The UE is required to satisfy regulations of Federal Communication Commission (FCC) related to maximum radiation to human bodies for the sake of health and safety. For example, in Rel. 15 NR, some limitation methods are defined as definition for limiting exposure.

As one of the limitation methods, limitation using power management maximum power reduction (P-MPR, maximum permitted UE output power reduction) is defined. For example, the UE maximum output power $P_{CMAX,f,c}$ is configured so that corresponding $P_{UMAX,f,c}$ (measured maximum output power, measured maximum configured UE output power) satisfies the following expression.

$$P_{Powerclass} - \text{MAX}(\text{MAX}(\text{MPR}_{f,c}, A\text{-MPR}_{f,c}) + \Delta MB_{P,n}, P\text{-MPR}_{f,c}) - \text{MAX}\{T(\text{MAX}(\text{MPR}_{f,c}, A\text{-MPR}_{f,c})), T(P\text{-MPR}_{f,c})\} \leq P_{UMAX,f,c} \leq \text{EIRP}_{max})$$

$\text{EIRP}_{max}$ is a maximum value of corresponding measurement peak equivalent isotopically radiated power (EIRP). $P\text{-MPR}_{f,c}$ is a value indicating reduction of maximum output power permitted for the carrier f of the serving cell c.

In NR, the following is studied: UL transmit beam selection is prompted by taking UL coverage loss due to MPE into consideration based on UL beam indication for the sake of rapid selection of a UL panel regarding the UE equipped with a plurality of panels.

Incidentally, in specifications of Rel. 15 NR, the PHR may be triggered when path loss has changed by more than a given threshold after the last transmission of the PHR regarding a serving cell in which at least one of any MAC entity used as path loss reference is activated. However, the path loss reference may change due to change of a beam/panel in the UE (for example, due to MPE), update of a path loss reference signal (for example, update based on the MAC CE, use of a default path loss reference signal), or the like. In these cases, it is assumed that the PHR is not necessarily triggered. This, however, is not considered in the current specifications. Unless appropriate transmission of the PHR is performed, communication throughput, communication quality, and the like may be deteriorated.

In view of this, the inventors of the present invention came up with the idea of a method for appropriately carrying out panel specific PHR trigger/transmission.

Embodiments according to the present disclosure will be described in detail below with reference to the drawings. A radio communication method according to each embodiment may be individually applied, or may be applied in combination.

Note that, in the present disclosure, activate, deactivate, indicate, select, configure, update, determine, and the like may be interchangeably interpreted as each other. In the present disclosure, a sequence, a list, a set, a group, and the like may be interchangeably interpreted as each other.

Note that, in the present disclosure, a panel, a beam, a panel group, a beam group, an Uplink (UL) transmission entity, a TRP, spatial relation information (SRI), spatial relation, a control resource set (CORESET), a PDSCH, a codeword, a base station, a given antenna port (for example, a demodulation reference signal (DMRS) port), a given antenna port group (for example, a DMRS port group), a given group (for example, a code division multiplexing (CDM) group, a given reference signal group, a CORESET group), a given resource (for example, a given reference signal resource), a given resource set (for example, a given reference signal resource set), a CORESET pool, and the like may be interchangeably interpreted as each other.

A panel Identifier (ID) and a panel may be interchangeably interpreted as each other. In other words, a TRP ID and a TRP, a CORESET group ID and a CORESET group, and the like may be interchangeably interpreted as each other. An ID and an index may be interchangeably interpreted as each other.

(Radio Communication Method)

In the following, the present disclosure will describe an embodiment in which the UE determines a relationship between an SRS and a panel, and reports the relationship to the base station. The report may be referred to as panel report or the like. Note that the panel report may be transmitted when the base station configures/indicates the relationship between the SRS and the panel.

First Embodiment

A first embodiment relates to panel specific PHR.

Note that, when the panel specific PHR is used, $P_{CMAX}$, PH, P-MPR, and the like related to a reported panel may be applied in common regarding the panel. When beam group/panel group specific PHR is used, the same PHR is shared in one group. In other words, $P_{CMAX}$, PH, P-MPR, and the like related to all of the beams/panels in a reported group may be applied in common regarding the group. According to the configuration, signaling overhead can be preferably reduced.

Embodiment 1.1

In Embodiment 1.1, a triggering event (which may be referred to as a trigger event) of the panel specific PHR will be described.

The panel specific PHR may be triggered when, for example, a trigger event of at least one of the following (1) to (5) occurs:
- (1) Path loss has changed by more than a given threshold after the last transmission of the panel specific PHR for a given panel regarding a serving cell in which at least one of any MAC entity used as path loss reference for UL transmission via (using) the panel is activated.
- (2) P-MPR of the panel has changed by more than a given threshold after the last transmission of the panel specific PHR for a given panel.
- (3) P-MPR of a given panel is higher than a given threshold.
- (4) A prohibit timer (for example, a timer configured by a higher layer parameter phr-ProhibitTimer) expires or has expired.
- (5) A periodic timer (for example, a timer configured by a higher layer parameter phr-PeriodicTimer) expires.

Regarding (1) above, the change of the path loss may be a change (difference) between path loss measured for UL transmission via a panel at given time (for example, the current time) and path loss measured for UL transmission via the panel at time when panel specific PHR for the panel is last transmitted.

Regarding (1) above, the change of the path loss may be a change (difference) between path loss measured for UL transmission via a given beam/panel of a panel group/beam group at given time (for example, the current time) and path loss measured for UL transmission via any beam/panel (which may be the same as or different from the above given beam/panel) of the panel group/beam group at time when panel group/beam group specific PHR for the panel group/beam group is last transmitted.

In reference to (2) above, in the present disclosure, P-MPR may be interchangeably interpreted as required power backoff due to power management, allowed maximum output power reduction, P-MPR (P-MPR for the serving cell c), and the like.

The threshold regarding (1) and (2) above may be provided by a higher layer parameter (for example, phr-TxPowerFactorChange) (the unit thereof is dB).

The threshold regarding (3) above may be provided by the higher layer parameter related to the threshold regarding (1) and (2) above, or may be provided by another higher layer parameter.

(4) above will be described later in the second embodiment. (5) above will be described later in the second embodiment.

Note that the conditions that a trigger event occurs are not limited to (1) to (5) above, and there may be other conditions.

Embodiment 1.2

In Embodiment 1.2, a panel specific PHR MAC CE transmitted when a panel specific PHR is triggered will be described.

The panel specific PHR MAC CE may include a panel ID.

FIGS. 2A to 2D are each a diagram to show an example of a configuration of the panel specific PHR MAC CE. Each of the present examples is an example of the single entry PHR MAC CE regarding a PCell. However, this is not restrictive. The PCell may be interpreted as another cell (for example, an SCell). The multiple entry PHR MAC CE including a plurality of these configurations may be used (in this case, type 1 PH may be interpreted as PH of another type).

Figure 2A:
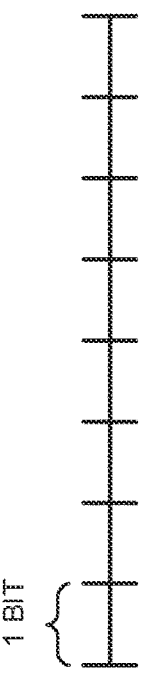
FIGS. 2A to 2D are each a diagram to show an example of a configuration of a panel specific PHR MAC CE.

As shown in FIG. 2A, the panel specific PHR MAC CE may be a MAC CE obtained by adding one panel ID field (in FIG. 2A, 6 bits) indicating a panel ID to the single entry PHR MAC CE of FIG. 1. When the panel ID field is 4 bits or less, as shown in FIG. 2B, the R field of the single entry PHR MAC CE of FIG. 1 may be replaced by a panel ID field (in FIG. 2B, 2 bits).

Figure 2B:
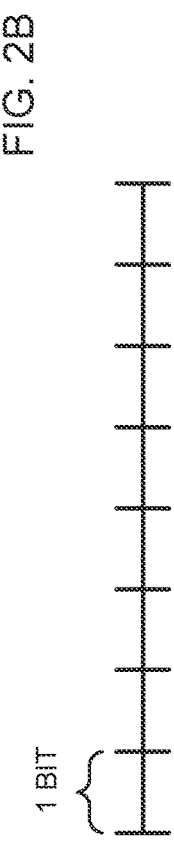

The PH field and the $P_{CMAX,f,c}$ field in FIGS. 2A and 2B may correspond to a value regarding a panel of the panel ID indicated by the panel ID field.

Figure 2C:
Figure 2D:

As shown in FIG. 2C and FIG. 2D, the panel specific PHR MAC CE may include a plurality of panel ID fields. FIG. 2C shows a MAC CE including two configurations of FIG. 2A, and FIG. 2D shows a MAC CE including two configurations of FIG. 2B.

In FIG. 2C and FIG. 2D, "#1" indicates a field related to the first panel indicated by panel ID #1, "#2" indicates a field related to the second panel indicated by panel ID #2.

Note that the panel ID field may uniquely indicate a panel regardless of whether or not it is active (may be configured capable of expressing (identifying) all of the panels of the UE), or may indicate only an active panel. In this manner, the "panel" in the present disclosure may be interchangeably interpreted as an activated panel, an active panel, and the like.

Figure 3B:
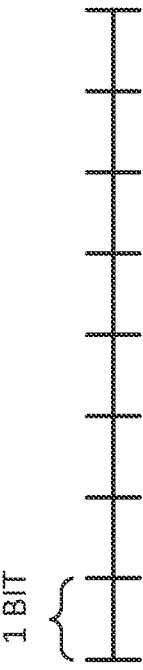
FIGS. 3A and 3B are each a diagram to show another example of a configuration of the panel specific PHR MAC CE.
Figure 3A:
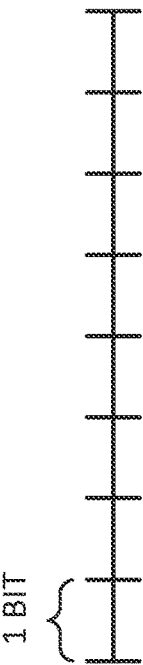

FIGS. 3A and 3B are each a diagram to show another example of a configuration of the panel specific PHR MAC CE. Each of the present examples is an example of the single entry PHR MAC CE regarding a PCell. However, this is not restrictive. The PCell may be interpreted as another cell (for example, an SCell). The multiple entry PHR MAC CE including a plurality of these configurations may be used (in this case, type 1 PH may be interpreted as PH of another type).

FIG. 3A shows an example of the panel specific PHR MAC CE not including a panel ID field. "#i" (i=1 to 4) of each field may indicate a field related to the i-th panel, or may indicate a field related to a panel indicated by panel ID #i.

The MAC CE as shown in FIG. 3A may be used by the UE satisfying at least one of the following:
- The UE that has reported information related to the number of panels included in (supported by) the UE by using UE capability information.
- The network (base station) has configured the number of panels to be reported in the PHR MAC CE to the UE by using higher layer signaling, physical layer signaling, or the like.
- The UE has reported the number of panels to be reported in the PHR MAC CE to the network (base station) by using higher layer signaling, physical layer signaling, or the like.

FIG. 3A may correspond to a case in which the number of panels is four.

The MAC CE as shown in FIG. 3A may be a MAC CE obtained by omitting all of the panel ID fields in the MAC CE of FIG. 2C when the UE reports information related to all of the panels.

FIG. 3B shows an example of the panel specific PHR MAC CE including a panel ID field corresponding to each panel ID. An AX (X=0 to 3) field indicates whether or not information (for example, the PH field, the $P_{CMAX,f,c}$ field) regarding panel #X+1 is included in the MAC CE (whether or not the information is reported by the MAC CE). For example, the PHR MAC CE of A0 field='0' does not include the information regarding panel #1, and the PHR MAC CE of A0 field='1' includes the information regarding panel #1.

FIG. 3B shows an example of A0 field=A1 field='1' and A2 field=A3 field='0'.

Note that the order of fields included in each MAC CE is not limited to the order in these examples. For example, in six octets as with the case of FIG. 2C, a MAC CE including PH #1, $P_{CMAX,f,c}$ #1, PH #2, $P_{CMAX,f,c}$ #2, panel ID #1, and panel ID #2 in the mentioned order may be used.

The number of panels included by the UE is not limited to four, and may be any value. In this case, the number of each of the fields (for example, the number of AX fields of FIG. 3B) may be increased or decreased from the example shown above.

The panel specific PHR MAC CE may or may not include a P-MPR field indicating P-MPR for a panel of a panel ID implicitly or explicitly shown by the MAC CE. When the PHR is triggered by a specific trigger event (for example, (2) or (3)) among the trigger events described above, the panel specific PHR MAC CE may include the P-MPR field; otherwise, the panel specific PHR MAC CE may not include the P-MPR field.

Note that, when the panel specific PHR is triggered based on the above-described trigger event, the panel specific PHR MAC CE may include only information (for example, the PH field, the $P_{CMAX,f,c}$ field, the P-MPR field, and the like) for a panel corresponding to the trigger event that has occurred (satisfying at least one condition of (1) to (5) above). The panel specific PHR MAC CE may include not only the information for the panel corresponding to the trigger event that has occurred but also information for a panel independent of the trigger event that has occurred. For example, the panel specific PHR MAC CE may include information for all of the panels.

When the above-described trigger event occurs regarding a plurality of panels, information (for example, the PH field, the $P_{CMAX,f,c}$ field, the P-MPR field, and the like) for the plurality of panels corresponding to the trigger event that has occurred may be included.

According to the first embodiment described in the above, the UE can preferably trigger panel specific PHR MAC CE transmission related to an appropriate panel, based on the trigger event.

Second Embodiment

A second embodiment relates to a prohibit timer (for example, phr-ProhibitTimer).
Regarding the panel specific PHR, the prohibit timer may satisfy at least one of the following:
  Embodiment 2.1: One prohibit timer is maintained (or used) for all of the panels.
  Embodiment 2.2: One prohibit timer is maintained (or used) for one panel.
  Embodiment 2.3: One prohibit timer is maintained (or used) for one panel group.

In a case of Embodiment 2.1, the UE may assume that, while the prohibit timer is running, any panel specific PHR is not triggered.

In a case of Embodiment 2.1, the panel specific PHR for a given panel may be triggered when the trigger event of (4) of Embodiment 1.1 and at least one trigger event of (1) to (3) regarding the panel occur. When the panel specific PHR (panel specific PHR MAC CE) for any panel is transmitted, the prohibit timer may restart. According to Embodiment 2.1, a plurality of prohibit timers need not be managed, and thus complexity of the UE can be reduced.

Note that, in the present disclosure, "the timer starts (or restarts)" may be interchangeably interpreted as "the MAC entity of the UE starts (or restarts) the timer".

In a case of Embodiment 2.2, the UE may assume that, while the prohibit timer for a given panel is running, the panel specific PHR for the panel is not triggered.

In a case of Embodiment 2.2, an independent prohibit timer is used for each panel. The panel specific PHR for a given panel may be triggered when the trigger event of (4) of Embodiment 1.1 regarding the panel and at least one trigger event of (1) to (3) regarding the panel occur. When the panel specific PHR (panel specific PHR MAC CE) for a given panel is transmitted, the prohibit timer for the panel may restart. According to Embodiment 2.2, a case in which PHR transmission for another panel is prevented due to PHR transmission for a given panel can be reduced.

In a case of Embodiment 2.3, the UE may assume that, while the prohibit timer for a given panel group is running, the panel specific PHR for the panel group (or any panel belonging to the panel group) is not triggered.

In a case of Embodiment 2.3, an independent prohibit timer is used for each panel group. The panel specific PHR for a panel of a given panel group may be triggered when the trigger event of (4) of Embodiment 1.1 regarding the panel group and at least one trigger event of (1) to (3) regarding the panel occur. When the panel specific PHR (panel specific PHR MAC CE) for any panel of a given panel group is transmitted, the prohibit timer for the panel group may restart. According to Embodiment 2.3, although the prohibit timer is shared in the panel group, the PHR can be independently triggered/transmitted regarding each panel in the panel group.

Figure 4A:
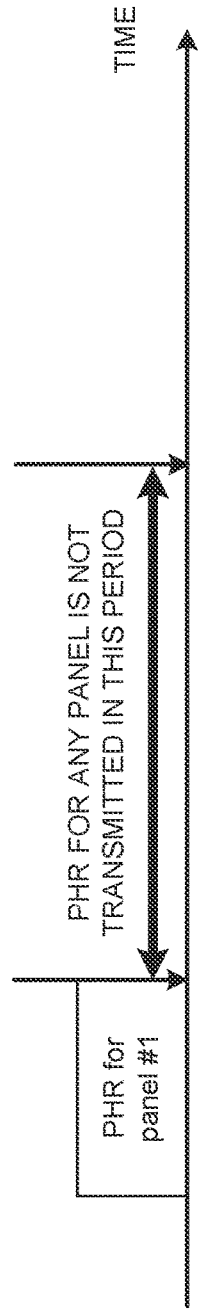
FIGS. 4A to 4C are each a diagram to show an example of control related to a prohibit timer according to a second embodiment.
Figure 4B:
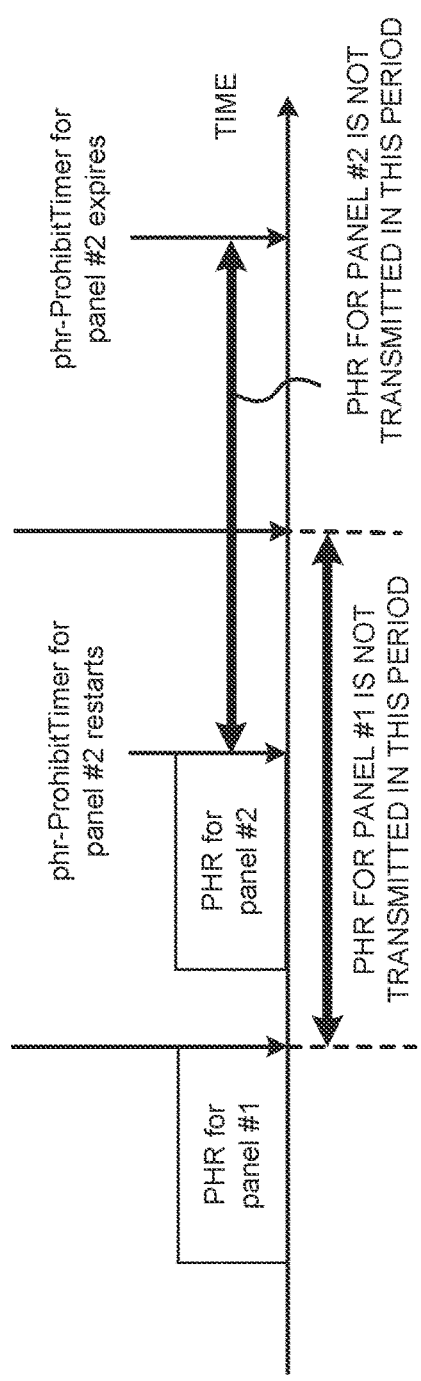
Figure 4C:

FIGS. 4A to 4C are each a diagram to show an example of control related to the prohibit timer according to the second embodiment. FIGS. 4A to 4C show cases in which the UE uses the prohibit timer of Embodiments 2.1 to 2.3, respectively. Note that, regarding FIG. 4C, it is assumed that panel group #a includes panels #1 and #2.

In FIG. 4A, when the PHR for panel #1 is transmitted, the prohibit timer restarts. The PHR for any panel is not triggered/transmitted until the prohibit timer expires.

In FIG. 4B, when the PHR for panel #1 is transmitted, the prohibit timer for panel #1 restarts. The PHR regarding panel #1 is not triggered until the prohibit timer expires. Meanwhile, the PHR for panel #2 may be triggered/transmitted even though the prohibit timer for panel #1 is running.

In FIG. 4C, when the PHR for panel #1 is transmitted, the prohibit timer for panel group #a to which panel #1 belongs restarts. The PHR regarding panels #1 and #2 included in panel group #a is not triggered until the prohibit timer expires. In the present example, after the prohibit timer expires, the PHR for panel #2 is triggered/transmitted.

According to the second embodiment described in the above, the UE can preferably trigger panel specific PHR transmission, based on the prohibit timer.

Third Embodiment

A third embodiment relates to a periodic timer (for example, phr-PeriodicTimer).

Regarding the panel specific PHR, the periodic timer may satisfy at least one of the following:

Embodiment 3.1: One periodic timer is maintained (or used) for all of the panels.

Embodiment 3.2: One periodic timer is maintained (or used) for one panel.

Embodiment 3.3: One periodic timer is maintained (or used) for one panel group.

In a case of Embodiment 3.1, after the periodic timer expires, the UE may trigger the panel specific PHR for all of the panels.

In a case of Embodiment 3.1, the panel specific PHR for a given panel may be triggered when the trigger event of (5) of Embodiment 1.1 occurs. In Embodiment 3.1, the PHR triggered by the trigger event of (5) above (this PHR may be referred to as periodic PHR) may be the PHR for all of the panels. The periodic timer may restart when the panel specific PHR (panel specific PHR MAC CE) for any panel is transmitted. The periodic timer may restart only when the periodic PHR is transmitted. According to Embodiment 3.1, a plurality of periodic timers need not be managed, and thus complexity of the UE can be reduced.

In a case of Embodiment 3.2, after the periodic timer for a given panel expires, the UE may trigger the panel specific PHR for the panel.

In a case of Embodiment 3.2, an independent periodic timer is used for each panel. The panel specific PHR for a given panel may be triggered when the trigger event of (5) of Embodiment 1.1 regarding the panel occurs. When the panel specific PHR (panel specific PHR MAC CE) regarding a given panel is transmitted, the periodic timer for the panel may restart. According to Embodiment 3.2, the PHR for each panel can be preferably periodically transmitted.

In a case of Embodiment 3.3, after the periodic timer for a given panel group expires, the UE may trigger the panel specific PHR for the panel group (or any panel belonging to the panel group).

In a case of Embodiment 3.3, an independent periodic timer is used for each panel group. The panel specific PHR for a panel of a given panel group may be triggered when the trigger event of (5) of Embodiment 1.1 regarding the panel group occurs. When the panel specific PHR (panel specific PHR MAC CE) for any panel of a given panel group is transmitted, the periodic timer for the panel group may restart. According to Embodiment 3.3, the periodic timer is shared in the panel group, and the panel specific PHR can be transmitted after the elapse of the time of the periodic timer from the last panel specific PHR transmission in the panel group. In other words, excessive transmission of the panel specific PHR based on the periodic timer can be reduced.

Note that, regarding Embodiments 3.2 and 3.3 as well, as is described in Embodiment 3.1, the configuration that the periodic timer restarts only when the periodic PHR is transmitted may be adopted.

Figure 5A:
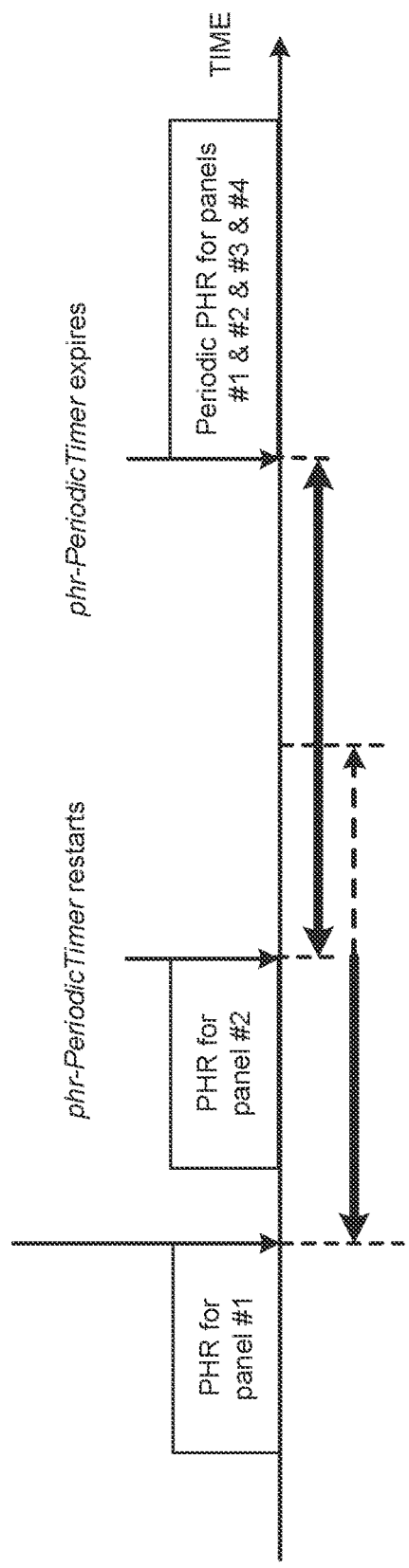
FIGS. 5A and 5B are each a diagram to show an example of control related to a periodic timer according to a third embodiment.
Figure 5B:
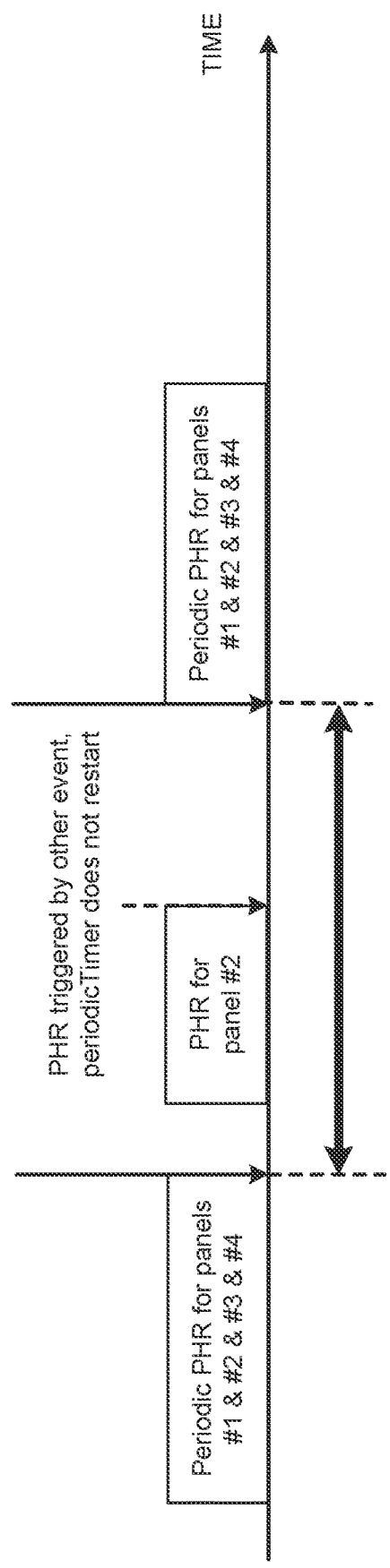

FIGS. 5A and 5B are each a diagram to show an example of control related to the periodic timer according to the third embodiment. FIGS. 5A and 5B each show a case in which the UE uses the periodic timer of Embodiment 3.1. In the present example, it is assumed that the UE includes four panels (panels #1 to #4). With the periodic PHR, the PHR related to these four panels is transmitted. Note that, in the following figures, simple description of "PHR" may refer to any PHR (which may be periodic PHR, or may be other PHR).

FIG. 5A shows a case in which the periodic timer is restarted by any panel specific PHR transmission. In FIG. 5A, when the PHR for panel #1 is transmitted, the periodic timer restarts. In the present example, before the periodic timer expires, the PHR for panel #2 is transmitted, and the periodic timer restarts. After the periodic timer expires, the periodic PHR for all of the panels is triggered/transmitted.

FIG. 5B shows a case in which the periodic timer is restarted only by periodic PHR transmission. In FIG. 5B, even when panel specific PHR (in the present example, PHR for panel #2 is triggered by another trigger event) other than the periodic PHR is transmitted before the periodic timer expires, the periodic timer continues to run without being restarted.

FIGS. 6A and 6B are each a diagram to show another example of control related to the periodic timer according to the third embodiment. FIGS. 6A and 6B show cases in which the UE uses the periodic timer of Embodiments 3.2 and 3.3, respectively. Note that, regarding FIG. 6B, it is assumed that panel group #a includes panels #1 and #2.

In FIG. 6A, when the PHR for panel #1 is transmitted, the periodic timer for panel #1 restarts, and after the periodic timer expires, the periodic PHR for panel #1 is triggered/transmitted. When the PHR for panel #2 is transmitted, the periodic timer for panel #2 restarts, and after the periodic timer expires, the periodic PHR for panel #2 is triggered/transmitted. The periodic timer for panel #1 and the periodic timer for panel #2 run independently of each other.

In FIG. 6B, when the PHR for panel #1 is transmitted, the periodic timer for panel group #a to which panel #1 belongs restarts. In the present example, before the periodic timer expires, the PHR for panel #2 is transmitted, and the periodic timer for panel group #a to which panel #2 belongs restarts. After the periodic timer expires, the periodic PHR for panels #1 and #2 included in panel group #a is triggered/transmitted.

According to the third embodiment described in the above, the UE can preferably trigger panel specific PHR transmission, based on the periodic timer.

Additional Notes

In each of the embodiments described above, in consideration of reduction of signaling overhead, reduction of complexity of the UE, and the like, at least one of the same amount of report, the same parameter, and the same timer may be used regarding one or more panels or one or more panel groups.

For example, in the first embodiment, a panel group (or a plurality of panels) may share the same PHR. In other words, $P_{CMAX}$, PH, P-MPR, and the like reported regarding a given panel group may be applied to all of the panels in the panel group.

In the second or third embodiment, a panel group (or a plurality of panels) may share the same prohibit timer/same periodic timer.

Whether or not a given panel group (or plurality of panels) shares the same PHR (or $P_{CMAX}$, or PH, or P-MPR, or the prohibit timer, or the periodic timer) may be configured for the UE by higher layer (for example, RRC) signaling, may be defined in a specification in advance, or may be determined by UE capability.

Each of the embodiments described above may be applied when the UE reports specific capability information, or may be applied when the UE is configured with specific information related to the embodiments described above by higher layer signaling. When the UE does not report the specific capability information or is not configured with the specific information, a PHR transmission method of Rel. 15/16 may be used.

For example, the specific capability information may be information indicating that the UE supports at least one of the panel specific PHR, the prohibit timer for PHR for a panel, and the periodic timer for PHR for a panel.

For example, the specific information may be information indicating that at least one of the panel specific PHR, the prohibit timer for PHR for a panel, and the periodic timer for PHR for a panel is enabled.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 7:
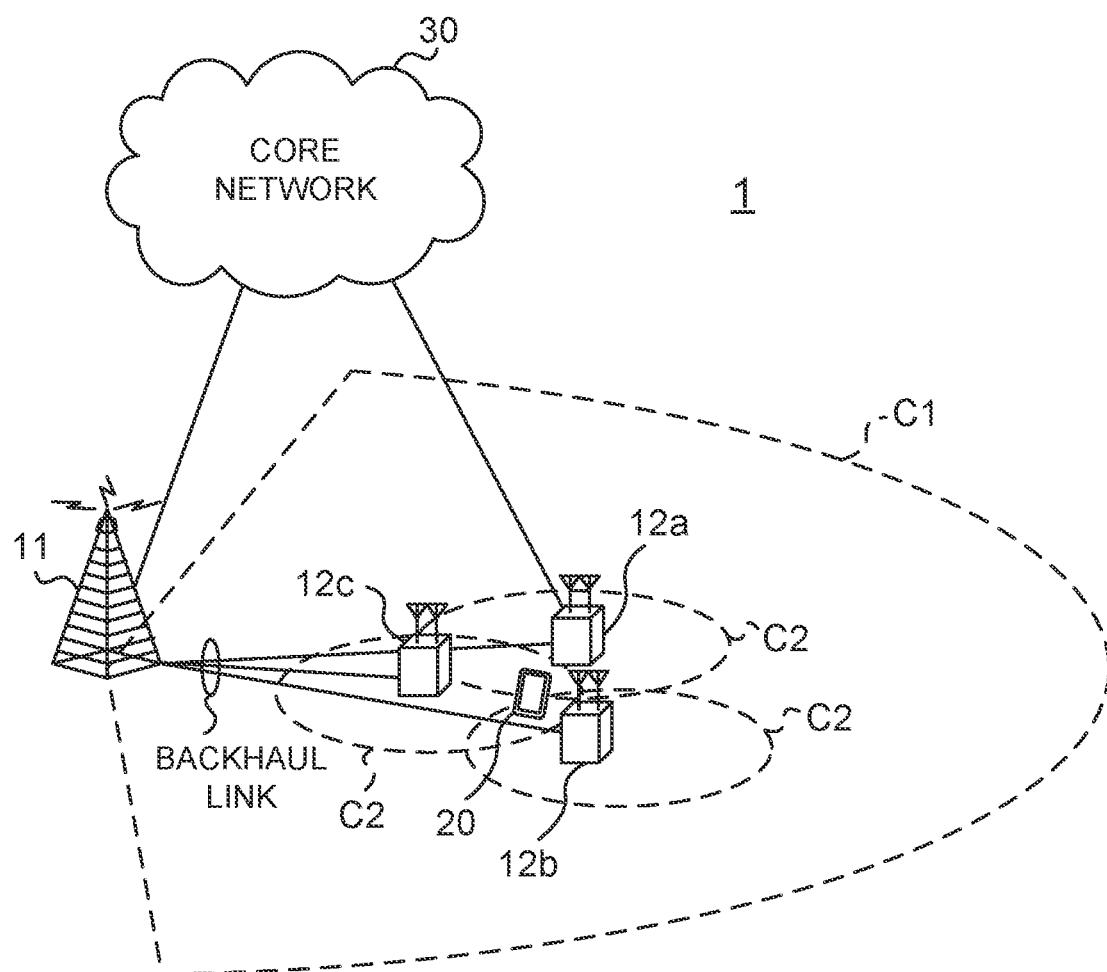
FIG. 7 is a diagram to show an example of a schematic structure of a radio communication system according to one embodiment.

FIG. 7 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 8:
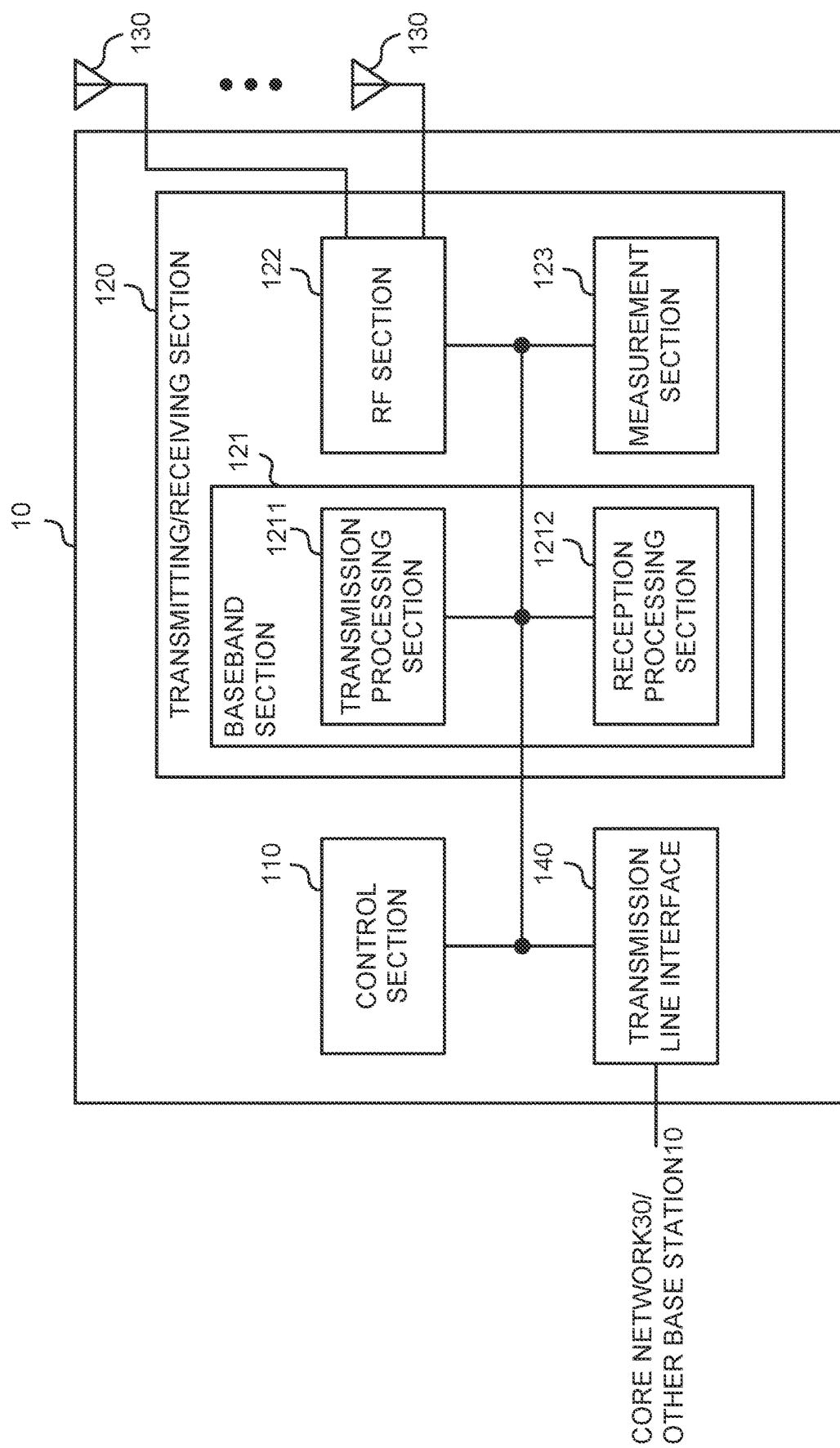
FIG. 8 is a diagram to show an example of a structure of a base station according to one embodiment.

FIG. 8 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit information related to a trigger event related to a given panel to the user terminal 20. The information may be information of at least one of phr-ProhibitTimer, phr-PeriodicTimer, phr-Tx-PowerFactorChange, a threshold related to P-MPR ((3) of the first embodiment), and the like. The information may be configured together with a related panel (for example, a panel ID), or may be included in configuration information of PHR.

The transmitting/receiving section 120 may receive a Medium Access Control (MAC) control element (panel specific PHR MAC CE) related to power headroom report (PHR) related to the given panel, which is triggered based on the information.

The trigger event may include an event in which a periodic timer related to the given panel expires.

(User Terminal)

Figure 9:
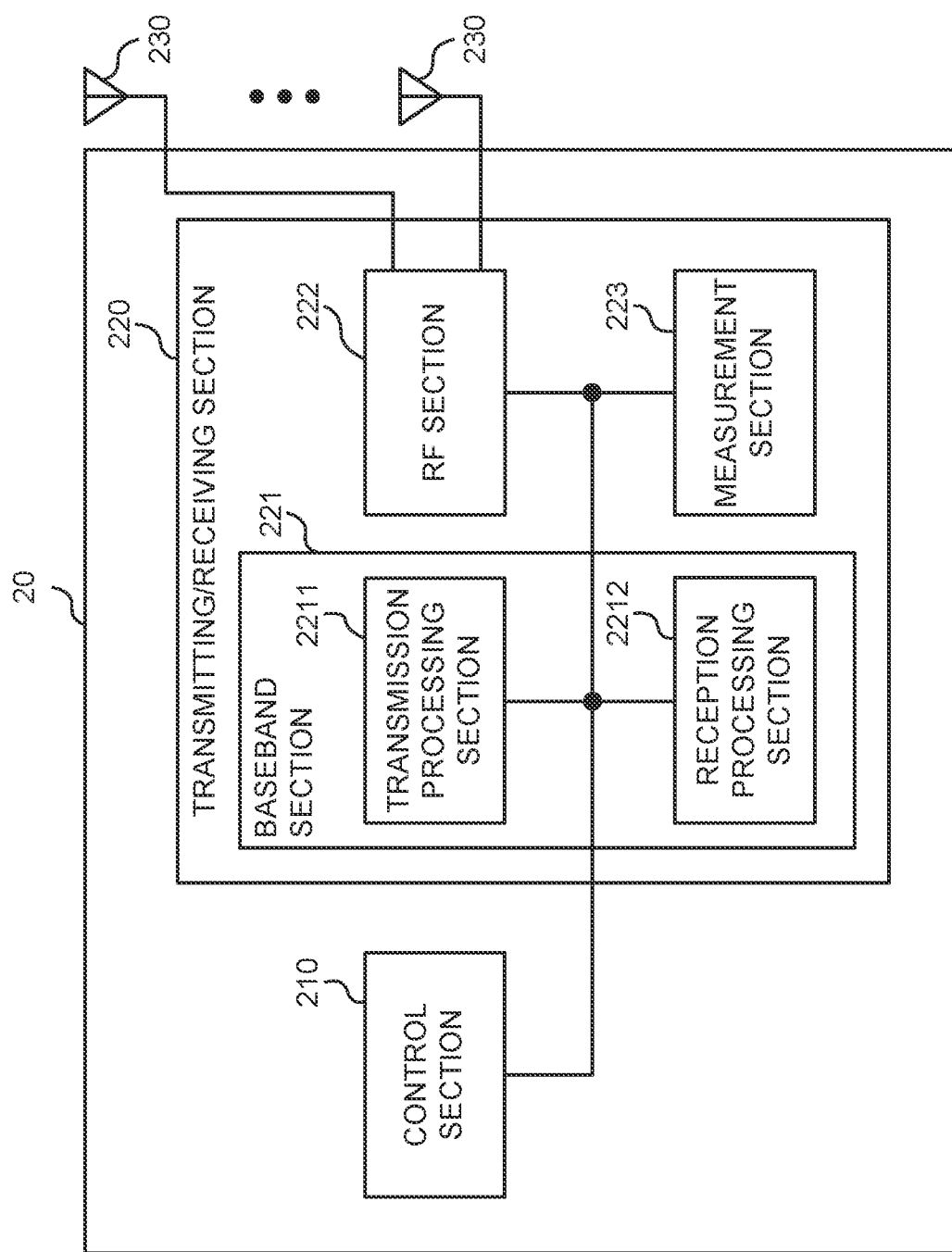
FIG. 9 is a diagram to show an example of a structure of a user terminal according to one embodiment.

FIG. 9 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that, when a trigger event related to a given panel occurs, the control section 210 may trigger power headroom report (PHR) related to the given panel.

The transmitting/receiving section 220 may transmit a Medium Access Control (MAC) control element related to the triggered PHR.

The trigger event may include an event in which path loss has changed by more than a given threshold after last transmission of panel specific PHR related to the given panel in a serving cell in which at least one of any MAC entity used as path loss reference for uplink transmission via the given panel is activated.

The trigger event may include an event in which power management maximum power reduction (P-MPR) of the given panel has changed by more than a given threshold after last transmission of panel specific PHR related to the given panel.

The trigger event may include an event in which a prohibit timer related to the given panel expires or has expired.

The trigger event may include an event in which a periodic timer related to the given panel expires.

After the periodic timer expires, the control section 210 may trigger the PHR for all panels.

When the MAC CE triggered based on the periodic timer is transmitted, the control section 210 may restart the periodic timer, and when the MAC CE triggered based on another trigger event is transmitted, the control section 210 may not restart the periodic timer.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 10:
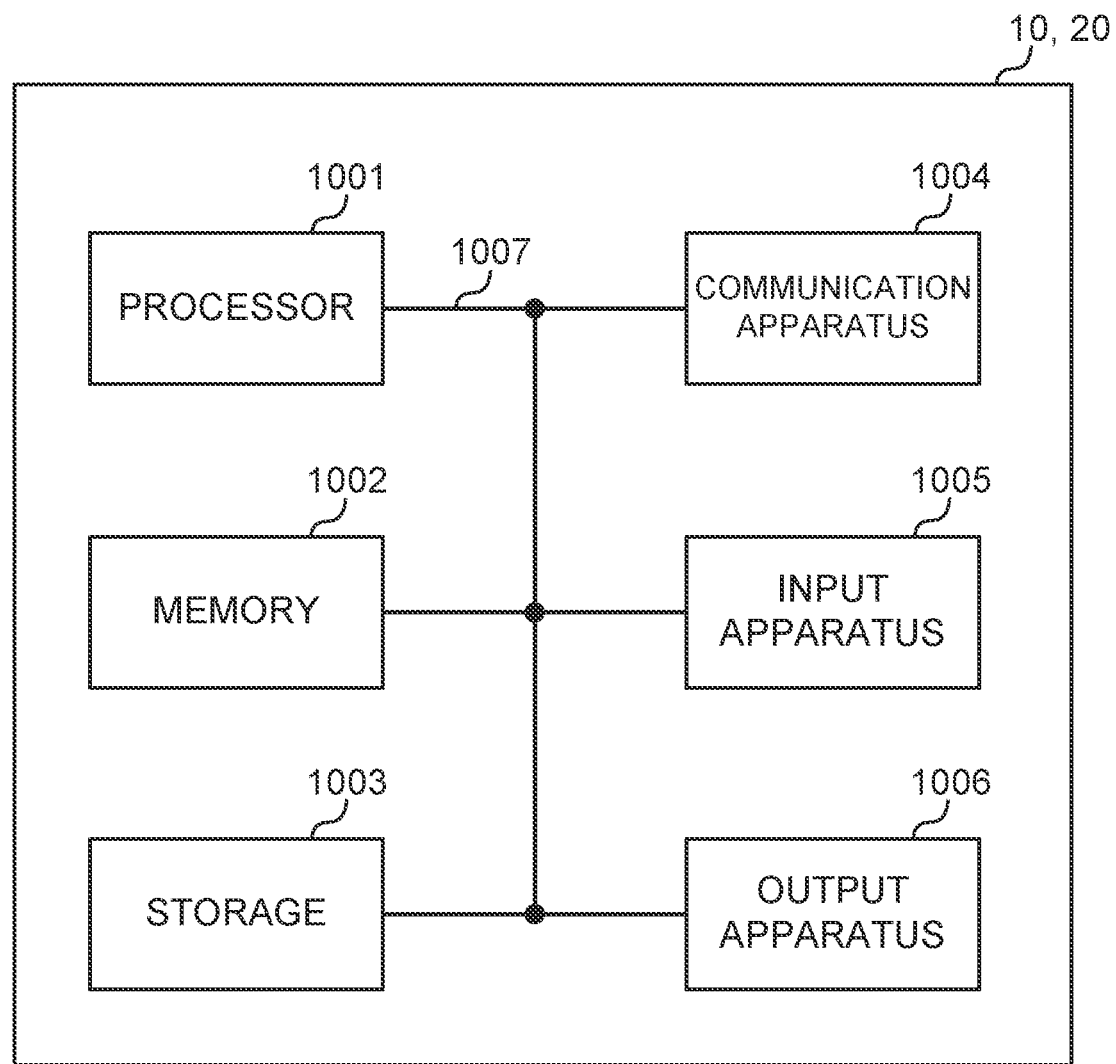
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (x is, for example, an integer, or a decimal fraction)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitter that reports information related to a number of panels by using capability information;
   a receiver that receives higher layer signaling related to a number of panels to be informed in a medium access control control element (MAC CE); and
   a processor that, when power management maximum power reduction (P-MPR) of at least one of multiple panels, the number of which is informed by the higher layer signaling, is higher than a threshold, triggers a power headroom report (PHR) associated with the multiple panels;
   wherein the transmitter transmits the MAC CE related to the PHR triggered, the MAC CE including: information related to a PHR of each of the multiple panels, the number of which is informed by the higher layer signaling; and information related to a maximum output power of each of the multiple panels.

2. A radio communication method for a terminal, comprising:
   reporting information related to a number of panels by using capability information;
   receiving higher layer signaling related to a number of panels to be informed in a medium access control control element (MAC CE);
   when power management maximum power reduction (P-MPR) of at least one of multiple panels, the number of which is informed by the higher layer signaling, is higher than a threshold, triggering a power headroom report (PHR) associated with the multiple panels; and
   transmitting the MAC CE related to the PHR triggered, the MAC CE including: information related to a PHR of each of the multiple panels, the number of which is informed by the higher layer signaling; and information related to a maximum output power of each of the multiple panels.

3. A system comprising a terminal and a base station, wherein the terminal comprises:
- a transmitter that reports information related to a number of panels by using capability information;
- a receiver that receives higher layer signaling related to a number of panels to be informed in a medium access control control element (MAC CE); and
- a processor that, when power management maximum power reduction (P-MPR) of at least one of multiple panels, the number of which is informed by the higher layer signaling, is higher than a threshold, triggers a power headroom report (PHR) associated with the multiple panels; and
- wherein the transmitter transmits MAC CE related to the PHR triggered, the MAC CE including: information related to a PHR of each of the multiple panels, the number of which is informed by the higher layer signaling; and information related to a maximum output power of each of the multiple panels, and the base station comprises:
- a receiver that receives a report transmitted by using the capability information; and
- a transmitter that transmits the higher layer signaling, wherein the receiver further receives the MAC CE.

* * * * *